United States Patent [19]

Medlin

[11] Patent Number: 4,953,137
[45] Date of Patent: Aug. 28, 1990

[54] METHOD FOR DETERMINING EARTH STRESSES IN FORMATIONS SURROUNDING A CASED WELL

[75] Inventor: William L. Medlin, Dallas, Tex.
[73] Assignee: Mobil Oil Corporation, New York, N.Y.
[21] Appl. No.: 467,108
[22] Filed: Jan. 18, 1990
[51] Int. Cl.[5] .............................................. G01V 1/40
[52] U.S. Cl. ........................................ 367/31; 73/151
[58] Field of Search ............... 367/25, 31, 35; 73/151, 73/152; 181/105

[56] References Cited

U.S. PATENT DOCUMENTS

| | | | |
|---|---|---|---|
| 4,542,655 | 9/1985 | Park et al. | 73/151 |
| 4,641,520 | 2/1987 | Mao | 73/151 |
| 4,781,062 | 11/1988 | Taylor | 73/152 |
| 4,899,320 | 2/1990 | Hearn et al. | 367/35 |

OTHER PUBLICATIONS

Huang, C. F., et al., "The Correlation of Tube Wave Events with Open Fractures in Fluid Filled Boreholes," Geological Survey of Canada, 1981, pp. 336-376.

Primary Examiner—Ian J. Lobo
Attorney, Agent, or Firm—Alexander J. McKillop; Charles J. Speciale; George W. Hager, Jr.

[57] ABSTRACT

An acoustic logging tool traverses a fluid-filled cased well with a monopole acoustic energy source. Pressure waves in the well fluid by the source generate symmetric tube waves in the well casing immediately adjacent the source. At least one spaced-apart receiver detects these tube waves after they have traveled directly to the receiver through the well casing. Asymmetry imparted to said tube waves as they travel along the well casing by the maximum and minimum earth stresses behind the well casing are identified and used to predict the azimuthal direction of subsequent hydraulic fractures.

20 Claims, 3 Drawing Sheets

METHOD FOR DETERMINING EARTH STRESSES IN FORMATIONS SURROUNDING A CASED WELL

BACKGROUND OF THE INVENTION

The present invention relates in general to a method for acoustic well logging and, more particularly, to a method for detecting the horizontal azimuthal direction of the maximum and minimum earth stresses in subsurface formations behind well casing.

It has long been known to acoustically log open wellbores to determine the velocities of compression ("P") waves and shear ("S") waves traveling through rock formations located in the wellbore region and tube waves ("T") traveling along the wellbore interface. Logging devices have been used for this purpose which normally comprise a sound source (transmitter) and one or more receivers disposed at pre-selected distances from the sound source.

By timing the travel of compression waves, shear waves, and/or tube waves between the source and each receiver, it is normally possible to determine the nature of surrounding rock formations including natural fracture identification. For descriptions of various logging techniques for collecting and analyzing compression wave, shear wave, tube wave, and secondary wave data, please refer to U.S. Pat. Nos. 3,333,238 (Caldwell); U.S. Pat. No. 3,362,011 (Zemanek, Jr.); Reissue No. 24,446 (Summers); 4,383,308 (Caldwell); 4,715,019 (Medlin et al); and U.S. patent application Ser. No. 192,446 (Medlin); and to "The Correlation of Tube Wave Events With Open Fractures in Fluid-Filled Boreholes" by Huang and Hunter in Geological Survey of Canada, pgs. 336-376, 1981.

In each of the foregoing references, the acoustic waves are generated in the formation in response to an acoustic energy transmission from within an open wellbore. However, the teachings of such references are not applicable to the identification of earth stress orientation in formations which are traversed by well casing, that is, well pipe cement bonded to the formation. An acoustic source within the cased well generates tube waves which travel along the well casing. These cased well tube waves are the predominant mode of wellbore excitation at low frequencies of below about 2 kHz. Their amplitudes are orders of magnitude greater than those of compressional or shear waves generated in the casing or formation. In cemented intervals the cased well tube waves can be sensitive to changing conditions behind the casing.

It is therefore a specific objective of the present invention to provide for a method of logging a cased well to detect earth stress orientation in the formations surrounding the cased well.

SUMMARY OF THE INVENTION

In accordance with the present invention there is provided a method of acoustic well logging for detecting earth stress orientation behind well casing and more specifically identifying the azimuthal directions of the maximum and minimum earth stresses. More particularly, a fluid-filled cased well is traversed with a well logging tool comprised of a monopole acoustic energy source, a directional gyroscope and a long spaced receiver body containing a plurality of directional receivers. The azimuthal orientation of the receiver string is given at all times by the gyroscope system. The entire configuration is centralized in the wellbore by bow springs located well above the source and well below the receiver body. The bow springs, gyroscope system, source and receiver body are all connected together by rigid steel couplers. Excitation of the monopole source produces fluid waves in the fill-fluid within the cased well. These fluid waves give rise to tube waves in the cased wellbore. As the tube waves propagate along the cased wellbore toward the receiver body they interact with the horizontal earth stresses. These stresses are characterized by a maximum along some direction and a minimum in the orthogonal direction. The interaction between these earth stresses and the tube waves produces characteristic patterns in the azimuthal variations of tube wave displacement amplitudes. These patterns can be measured by rotating the entire receiver string in small angular increments through a complete circle. At each angular step the acoustic source is excited and the maximum amplitude of the resulting tube waves recorded at each receiver. At an appropriate receiver distance, the critical spacing, the tube wave amplitude pattern measured consists of a pair of maxima and a pair of minima, each separated by 180 degrees. The identified azimuth of the pair of maxima represents the direction of minimum earth stress. The identified azimuth of the pair of minima represents the orthogonal direction of maximum earth stress.

In a more specific aspect, a monopole acoustic energy source, such as a Helmholtz resonator, is excited by a tone burst to generate tube wave displacements of sufficient amplitude to make the stress-induced asymmetry effects large enough to be measured. A receiver string consists of a long array of dipole receivers spaced sufficiently close together to provide at least one receiver near the critical spacing. Each receiver is made with a fundamental resonance matching the fundamental resonance of the source.

The stress data determined can be used to predict the direction of a hydraulically induced fracture because such a fracture always propagates in the direction of maximum horizontal earth stress. The method also has application to earthquake prediction through repetitive stress measurements in cased observation wells over long periods.

DESCRIPTION OF THE PREFERRED EMBODIMENT

Figure 1:
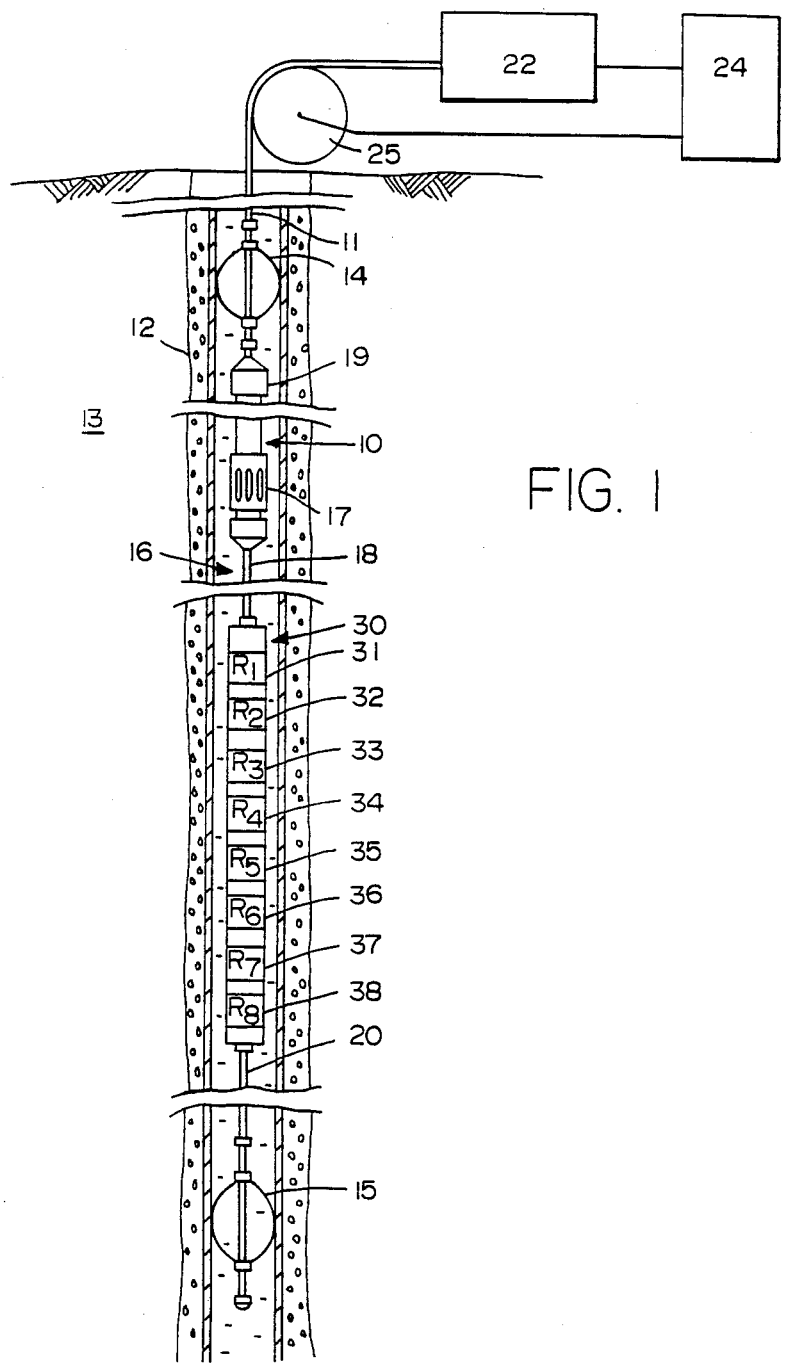
FIG. 1 illustrates an acoustic well logging system employed in carrying out the asymmetric tube wave logging method of the present invention in a cased well.

Referring now to FIG. 1, there is illustrated an acoustic logging system that is used in accordance with the present invention for measuring the azimuth of principal earth stresses behind well casing. The logging system includes an elongated logging tool 10 which is suspended from a cable 11 within a cased well 12 which traverses a subsurface formation of interest 13. The cased well 12 is filled with a liquid such as completion fluid 16. The logging tool comprises an acoustic source or transmitter 17, a directional gyroscope system 19 and a receiver body 30 containing a plurality of directional acoustic receivers 31-38 (i.e. R1-R8) for example. The transmitter and directional gyroscope are contained within the same rigid steel body. The receiver body is a hollow cylinder enclosure filled with silicone oil or other similar liquid. The receiver body is connected to the transmitter-gyroscope body by a long, rigid steel coupler 18. The entire tool assembly is centralized in the cased wellbore by a pair of bow springs 14 and 15. The upper bowspring 14 is attached to the steel body containing the transmitter and gyroscope with a long spacing between it and the transmitter and the lower bowspring 15 is connected to the receiver body by a long rigid, steel coupler 20 with a long spacing between it and the lower receiver 38, such spacings being effective to minimize acoustic wave diffractions and reflections in the fill-fluid which introduce anomalies into the cased well tube waves. The steel blades of the bowsprings are acoustically isolated from the wellbore casing by rubber pads. The receiver string R1-R8 can be rotated within the receiver body. It is rotated upon command in small angular steps of about 10 degrees each by a stepping motor (not shown) contained in the receiver body. The receiver body 30 is made of a material such as aluminum or fiberglass which is relatively transparent to the transmission of acoustic energy. Its wall thickness is very uniform so as to provide equal transparency to acoustic energy in all directions. Signals from the logging tool 10 are transmitted uphole by conductors within cable 11 to any suitable utilization system at the surface. For example, the utilization system is illustrated as comprising an uphole analysis and control circuit 22 and recorder 24 in order that the output from circuit 22 may be correlated with depth.

Having set forth the well logging system of FIG. 1 for generating and receiving acoustic energy within a cased well, the method of the present invention for use of such a system to measure the horizontal earth stress as a function of azimuth and to thereby determine the azimuthal directions of maximum and minimum earth stresses will now be described.

Transmitter 17 is a monopole acoustic energy source which emits acoustic energy equally in all directions in a plane perpendicular to the wellbore axis. The acoustic receivers 31-38 are directional devices which have a peak sensitivity in only one direction. All of the directional receivers in the receiver string are aligned with respect to their direction of peak sensitivity. The orientation of this peak sensitivity, with respect to magnetic north, is given by the gyroscope system 19 which is rigidly attached to the receiver string through the steel coupler 18. The transmitter and all of the receivers are matched so as to have fundamental resonances at the same frequency, preferably in the range 1-5 kHz.

The transmitter is excited by a sine wave tone burst of 3-5 cycles at the frequency corresponding to the fundamental resonance of the transmitter and receivers. The source excitation generates fluid waves in the fill-fluid within the cased well. These fluid waves give rise to tube waves in the cased wellbore. As the tube waves propagate along the cased wellbore they interact with the horizontal earth stresses. They are then detected by each of the directional receivers in the receiver body. The response of each receiver typically consists of a simple wavelet of 10-15 cycles duration. The maximum amplitude of the envelope of this wavelet can be used as a measure of the tube wave amplitude. Alternatively, the total area under all of the cycles making up the wavelet can be taken as another measure of tube wave amplitude. As yet another alternative, the Fourier transform of the entire wavelet can be generated and the area under the peak corresponding to the transmitter resonance can be taken as a measure of the tube wave amplitude.

Interactions between the horizontal earth stresses and the tube waves propagating along the wellbore have an effect on the amplitude of tube wave vibration. The earth stresses are characterized by a pair of orthogonal principal stress directions. Along one of these directions the earth stress is a maximum and along the other orthogonal direction it is a minimum. This stress asymmetry produces a corresponding asymmetry in the amplitude of tube wave displacements measured as a function of azimuth in a horizontal plane. This asymmetry can be detected by using a directional receiver to measure tube wave amplitudes as the receiver is rotated through 360 degrees while centralized in the wellbore at fixed depth.

The difference between the maximum and minimum earth stresses is typically very small, of the order of 100-200 pounds per square inch. When the stress difference is small the tube wave asymmetry effects are also small and therefore difficult to detect. The methods set forth in this invention provide ways to enhance the detection of these effects. Interactions between the tube waves and other modes of wellbore vibration produce additional effects which are mixed with the stress asymmetry effect. This mixing produces different asymmetry patterns when the receiver is rotated at different spacings from the transmitter. At the appropriate spacing, (i.e., the critical spacing) the asymmetry pattern consists of a pair of amplitude maxima separated by exactly 180 degrees and a pair of amplitude minima also separated by exactly 180 degrees. This pattern is used to determine the directions of maximum and minimum horizontal earth stress.

To make a logging measurement the tool is lowered to a selected depth. The orientation of the directional receiver string is sensed by the gyroscope system. The monopole source is excited by a tone burst and the response of each receiver recorded. For enhancement of data quality the source can be excited repetitively and the receiver signals stacked. The stepping motor then rotates the receiver string by a small angular increment, such as 10 degrees, and the procedure is repeated. This procedure is continued until the receiver string has been rotated through at least 360 degrees. The logging tool is then moved to a new depth and the entire procedure repeated.

Figure 2:
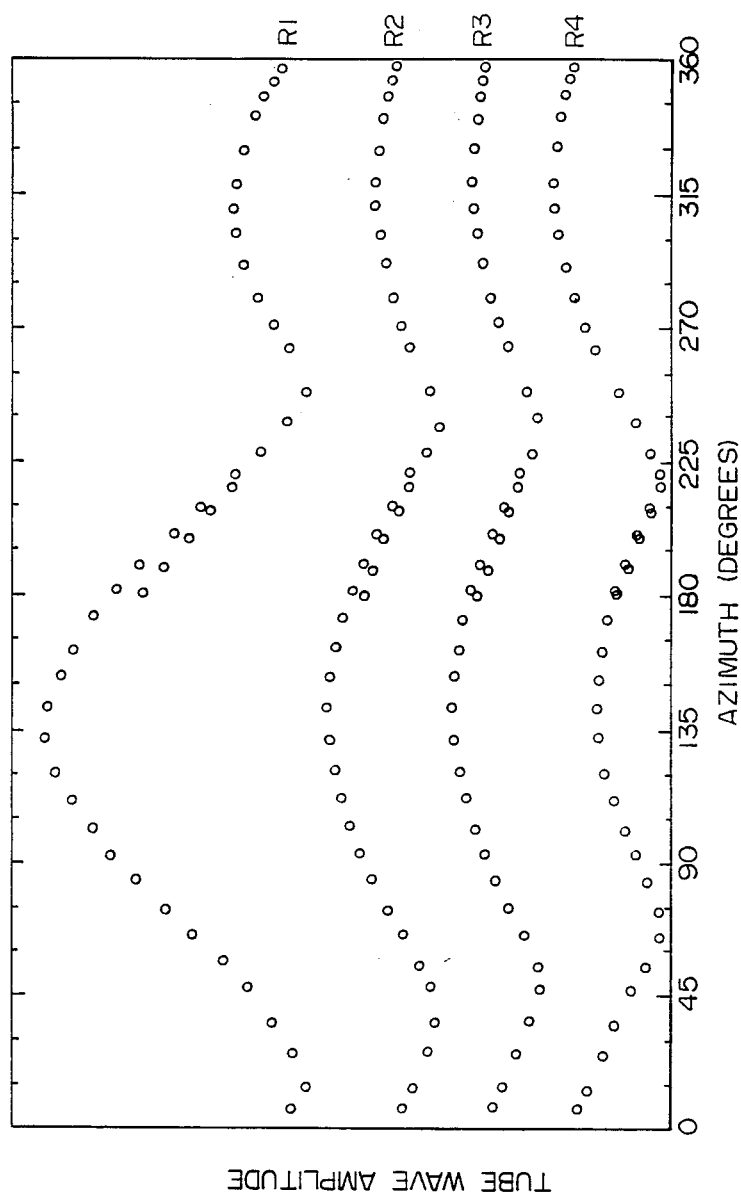
FIGS. 2 and 3 illustrate plots of tube wave amplitude versus azimuthal angle as obtained from log data recorded from various ones of the receivers R1-R8 of FIG. 1 respectively.

Logging data obtained by this procedure are illustrated in FIG. 2 which shows sequences of amplitude plots obtained by a plurality of four spaced apart receivers such as R1-R4, designated by 31-34 in FIG. 1. In this case the receivers are spaced apart from the transmitter by distances of 183, 210, 237 and 264 inches, respectively. The plot for each receiver was obtained by rotating the complete receiver string in small angular increments through more than 360 degrees at a fixed depth of 2200 ft. Tube waves were generated in the cased wellbore by exciting a Helmholtz resonator source with a 3-cycle tone burst at a frequency of 3.0 kHz. The amplitudes plotted in FIG. 2 represent the maximum amplitudes of the envelopes of the received wavelets. In the FIG. 2 plots receiver R3 is at the critical spacing. The R3 plot shows the characteristic pattern of a pair of maxima separated by 180 degrees and a pair of minima also separated by 180 degrees. The pair of minima at 55 and 235 degrees correspond to the vertical plane of maximum horizontal earth stress where magnetic north corresponds to 0 or 360 degrees. In this plane the horizontal earth stresses provide the greatest resistance to wellbore displacements associated with tube wave vibration. The pair of maxima at 145 and 325 degrees correspond to the vertical plane of minimum horizontal earth stress. In this plane the horizontal earth stresses provide the least resistance to wellbore displacements associated with tube wave vibrations. The R2 plot in FIG. 2 is slightly skewed with separations between maxima and minima different from 180 degrees. The R1 plot is skewed to an even greater degree. At receiver spacings closer to the transmitter than R1 the pattern becomes progressively more skewed, degenerating finally into a single cycle with only one maximum and one minimum. The R4 plot in FIG. 2 is skewed in a reverse sense. At spacings beyond R4 the skewedness becomes progressively exaggerated, degenerating finally into a single cycle. The maximum and minimum in this case are reversed from those of the single cycle produced at spacings close to the transmitter. The interval between 180 degrees and 225 degrees in FIG. 2 represents an overlap in which the receiver string has started on a second revolution around the wellbore. The small discrepancies between the two sets of points for the various receivers are due to small differences in centering of the tool in the wellbore.

The critical spacing varies with wellbore conditions. It is also sensitive to the lithology of the formation rock behind the casing. It can be determined for any set of wellbore conditions by using a long string of closely spaced receivers, such as R1-R8 in FIG. 1. This provides a way to recognize the sequence of skewed patterns and also insures that one of the receivers will be at or very close to the critical spacing as in FIG. 2.

The stress data illustrated in FIG. 2 provide a way to predict the azimuthal direction of a hydraulically induced vertical fracture. Such a fracture will always propagate in the direction of maximum horizontal earth stress. Thus, in the case corresponding to FIG. 2, the azimuthal direction of fracture propagation is predicted to be 55 degrees where magnetic north is 0 or 360 degrees. In the aforementioned U.S. patent application there is described another method for identifying the azimuthal direction of a hydraulically induced vertical fracture. In this method acoustic logging measurements similar to the ones described here are made after the fracture has been created. In this method the azimuth of the fracture cannot be determined until after the fracture is in place. This requires that logging measurements be made in the fractured interval after the hydraulic fracturing treatment is completed. This procedure introduces a number of difficulties. After a hydraulic fracturing treatment formation gas may flow into the wellbore, making it impossible to obtain acoustic logs because of the excessive compressibility of the gas bubbles. To avoid this problem it is necessary to circulate the gas-laden fluid out of the wellbore and replace it with a higher density fluid which prevents further gas flow into the wellbore. The density of this fluid must be high enough to produce a downhole pressure in excess of the formation gas pressure. Under these conditions the wellbore fluid flows into the fracture producing detrimental effects in the stimulation characteristics of the fracture. The present invention can be used to predict fracture azimuth before fracturing, thus avoiding these problems and offering valuable advance information for proper planning of well patterns, spacings, etc.

Figure 3:
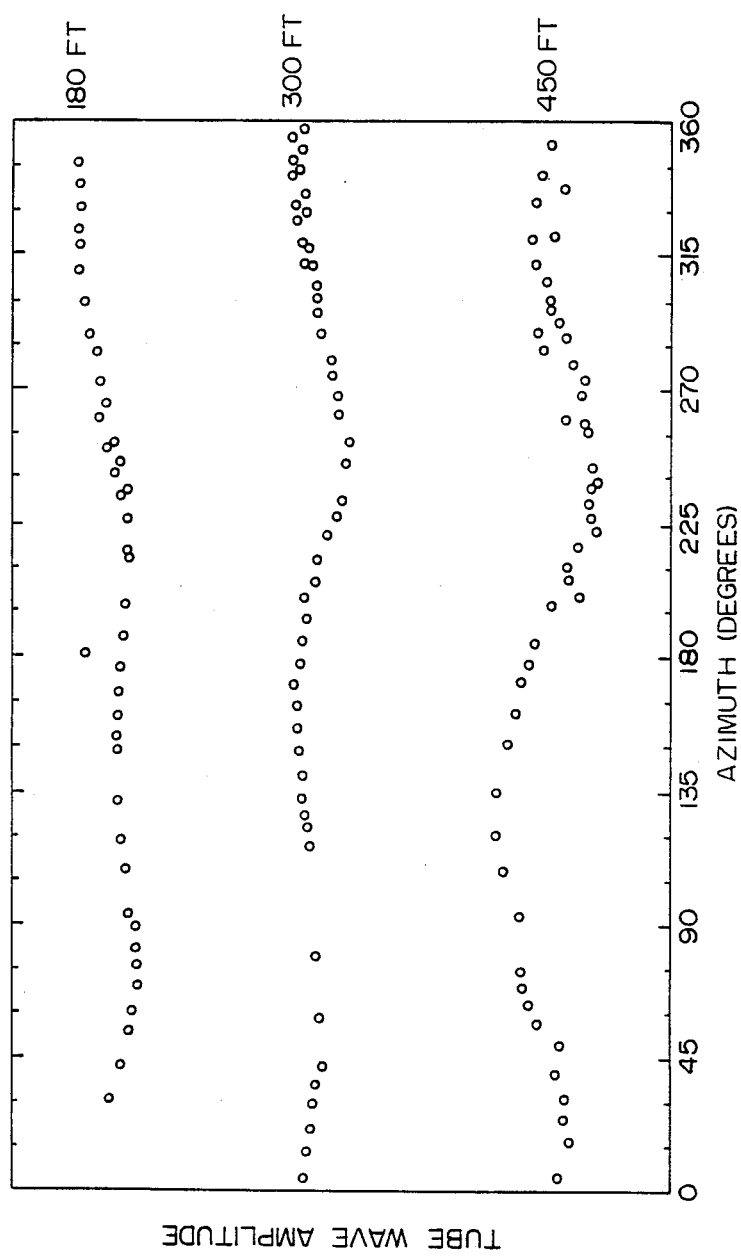

FIG. 3 shows tube wave amplitude plots obtained at depths of 450, 300 and 180 ft in the same well. All three plots were produced by the same receiver with the same gain settings, located at the critical spacing. These plots show that the ratio of maximum to minimum tube wave amplitude decreases significantly approaching the surface. This is consistent with the expected decrease in earth stresses approaching the surface. With proper calibration, absolute values of horizontal earth stresses can be estimated. Proper calibration can be obtained from hydraulic fracturing data. The so called instantaneous shut-in pressure measured at the end of a hydraulic fracturing treatment provides an absolute value of the minimum horizontal earth stress. By combining this measurement with a tube wave amplitude plot, absolute earth stresses can be estimated for all directions in the horizontal plane and at other depths in the same well.

Since the above described method provides a way to detect changes in horizontal earth stress conditions, it has application to earthquake prediction. In this application stress measurements are made in cased observation wells at regular intervals, such as weekly or monthly. Significant changes in stress conditions in a particular area can then serve as a warning of an impending earthquake. This method of earthquake prediction can be steadily improved through the experience.

Because the asymmetry effects used are very weak it is necessary to generate wellbore tube waves of the largest possible amplitude. A monopole source of the Helmholtz type generates tube waves of much larger amplitude than those generated by a dipole source of the bender type and is therefore a more preferable source for this application. Helmholtz resonator principles are well known for use in the generation of sound as described in *Fundamentals of Acoustics*, by L. E. Kinsler and A. R. Frey, Wiley and Sons, New York (1962), pg. 186. The use of Helmholtz resonators as sources for acoustic logging is described in U.S. Pat. No. 4,674,067 to Zemanek, Jr., the teaching of which is incorporated herein by reference. A suitable Helmholtz resonator consists of a hollow ceramic sphere with apertures at opposite ends. The apertures are of such diameter as to produce a strong fundamental resonance at a selected frequency in the range 1-5 kHz. The sphere is enclosed in a rubber boot and mounted in the transmitter body with the apertures directed along the vertical tool axis so as to produce the strongest possible tube waves in the wellbore. A more preferable source is made by stacking two or more Helmholtz spheres in such a way as to align all of the apertures with the vertical axis of the transmitter body. Such a source produces stronger tube wave energy than a source containing a single sphere. One such source employing stacking of resonator shells is described in U.S. Pat. No. 4,890,687 to Medlin, the teaching of which is incorporated herein by reference.

Directional receivers 31-38 preferably take the form of a dipole receiver of the bender-disc-type. The bender disc is highly directional with peak sensitivity in the direction perpendicular to the disc face. In the method of this invention it is mounted with its face centered in the receiver body 30 of FIG. 1 and parallel to the body axis. Mounted in this way, the bender disc is an excellent directional receiver for detection of tube waves. As a tube wave detector it is moderately sensitive to wellbore centering. Therefore, the bow spring centralizers, 14 and 15 of FIG. 1, are needed to avoid errors due to non centeredness. Dipole receivers of the bender-bartype are described in U.S. Pat. Nos. 4,516,228 to Zemanek, Jr.; and 4,649,525 to Angona and Zemanek, Jr., the teachings of which are incorporated herein by reference. Bender-disc-type receivers are supplied by Actran, Incorporated, Orlando, Fla. Each bender disc receiver is made with a fundamental resonance matching that of the monopole transmitter and preferably in the range 1–5 kHz.

The gyroscope system 19 preferably takes the form of a directional gyroscope which delivers a DC voltage whose magnitude is proportional to the angular rotation from a pre-selected direction determined from a magnetic compass setting at the surface. One example is a DC voltage increasing from 0 to 3.60 V as the tool is rotated clockwise through 360 degrees starting from an azimuth of magnetic north. A commercial device which functions in this way is Model DG 29-0700 directional gyroscope supplied by Humphrey, Inc., 9212 Balboa Avenue, San Diego, Calif.

Having now described a preferred embodiment of the present invention, it will be apparent to those skilled in the art of acoustic well logging that various changes and modifications may be made without departing from the spirit and scope of the invention as set forth in the appended claims.

I claim:

1. A method of acoustic well logging for identifying horizontal azimuthal direction of maximum and minimum earth stresses behind well casing comprising the steps of:
   (a) traversing a fluid-filled cased well with a well logging tool containing a monopole acoustic energy source,
   (b) rotating said logging tool as it traverses said cased well,
   (c) exciting said monopole acoustic energy source with a plurality of tone bursts of fixed frequency to drive said source to resonate and produce symmetric pressure waves in the fill-fluid within the cased well, the impact of said pressure waves against the casing of said well causing said casing to deflect and produce symmetric cased well tube waves immediately adjacent said source,
   (d) receiving said cased well tube waves by one or more receivers sensitive to asymmetric tube waves located at spaced apart positions along said logging tool, said maximum and minimum earth stresses imparting asymmetry into the amplitudes of said cased well tube waves as they travel along the well casing between said source and said one or more receivers,
   (e) recording the amplitudes of said received cased well tube waves,
   (f) identifying the azimuthal position of said logging tool as it rotates within said well casing,
   (g) identifying the horizontal azimuthal direction of the minimum earth stress behind the well casing from an increased tube wave amplitude which said minimum earth stress imparts to said cased well tube waves as they travel through the well casing between said source and said one or more receivers, and
   (h) identifying the horizontal azimuthal direction of the maximum earth stress behind the well casing from a decreased tube wave amplitude which said maximum earth stress imparts to said cased well tube waves as they travel through the well casing between said source and said one or more receivers.

2. The method of claim 1 further comprising the steps of:
   (a) recording said received cased well tube waves following each excitation of said acoustic energy source in the form of a wavelet of a plurality of cycles duration, and
   (b) determining the amplitude of an envelope of said wavelet as a measure of tube wave amplitude.

3. The method of claim 1 further comprising the steps of:
   (a) recording said received cased well tube waves following each excitation of said acoustic energy source in the form of a wavelet of a plurality of cycles duration, and
   (b) determining the total area under all the cycles making up said wavelet as a measure of tube wave amplitude.

4. The method of claim 1 further comprising the steps of:
   (a) recording said received cased well tube waves following each excitation of said acoustic energy source in the form of a wavelet of a plurality of cycles duration,
   (b) determining the Fourier transform of said wavelet, and
   (c) determining the area under the peak of said Fourier transform corresponding to acoustic energy source resonance as a measure of tube wave amplitude.

5. The method of claim 1 further comprising the step of identifying the azimuthal direction of a subsequent hydraulic fracture will follow in the formation behind said well casing from the azimuthal position of said logging tool at which there is minimum amplitude of said received tube waves.

6. The method of claim 1 wherein steps (a)–(g) are carried out before a hydraulic fracturing operation to identify the azimuthal direction of subsequent hydraulic fractures from the asymmetry imparted to said received tube waves by said earth stresses.

7. The method of claim 1 wherein steps (a)–(g) are carried out after a hydraulic fracturing operation to identify the completeness of said hydraulic fracturing operation in the formation behind the well casing.

8. The method of claim 1 further comprising the steps of:
   (a) recording the amplitudes of said received cased well tube waves over a period of days, and
   (b) detecting change in said tube wave amplitude over said period of days as a measure of change in earth stress conditions over said period.

9. The method of claim 8 wherein the measure of change in earth stress conditions over said period is utilized in earthquake prediction.

10. The method of claim 1 further including the steps of:
    (a) measuring instantaneous shut-in pressure at the end of a subsequent hydraulic fracturing operation, and
    (b) determining absolute earth stress conditions from said measured shut-in pressure and said recorded tube wave amplitudes.

11. The method of claim 1 wherein said monopole acoustic energy source is a Helmholtz resonator.

12. The method of claim 1 wherein the fixed frequency of said tone bursts for exciting said source is no greater than about 5 kHz.

13. The method of claim 1 wherein the fixed frequency of said tone bursts for exciting said source is in the range of 1 kHz to 5 kHz.

14. The method of claim 1 wherein said tone bursts are in the order of three to five cycles.

15. The method of claim 1 further comprising the step of containing said source and said one or more receivers in a continuous solid housing to minimize acoustic wave diffractions and reflections in said fill-fluid which introduce anomalies into said cased well tube waves.

16. The method of claim 1 further comprising the step of selecting the received cased well tube wave exhibiting the strongest asymmetry in tube wave amplitude for identifying the horizontal azimuthal directions of said maximum and minimum earth stresses.

17. The method of claim 16 wherein the received cased well tube wave is selected from the receiver located closest to critical spacing from said acoustic energy source at which each pair of maximum and minimum earth stresses are separated by azimuthal directions of 180°.

18. The method of claim 1 further comprising the step of centralizing said well logging tool within said cased well as said logging tool traverses said cased well.

19. The method of claim 18 wherein said step of centralizing said well logging tool is effected by a pair of bow springs, a first affixed to the logging tool above the acoustic energy source and a second affixed to the logging tool below the receiver spaced farthest from said acoustic energy source.

20. The method of claim 19 wherein said bow springs are spaced apart along said logging tool to minimize acoustic wave diffractions and reflections in said fill-fluid which introduce anomalies into said cased well tube waves.

* * * * *